United States Patent [19]

Hashimoto et al.

[11] Patent Number: 5,001,572
[45] Date of Patent: Mar. 19, 1991

[54] FACSIMILE EQUIPMENT

[75] Inventors: Yasuaki Hashimoto, Tokyo; Chiaki Motegi, Hino, both of Japan

[73] Assignee: Kabushiki Kaisha Toshiba, Kawasaki, Japan

[21] Appl. No.: 175,295

[22] Filed: Mar. 30, 1988

[30] Foreign Application Priority Data

Mar. 31, 1987 [JP] Japan ................................. 62-75827

[51] Int. Cl.⁵ ............................................... H04N 1/00
[52] U.S. Cl. .................................... 358/440; 358/400
[58] Field of Search ............... 358/257, 256, 400, 401, 358/434, 438, 440

[56] References Cited

U.S. PATENT DOCUMENTS

| | | | |
|---|---|---|---|
| 4,058,672 | 11/1977 | Crager et al. | 358/40 |
| 4,563,706 | 1/1986 | Nagashima | 358/257 |
| 4,604,653 | 8/1986 | Shimuzu | 358/257 |
| 4,661,857 | 4/1987 | Shimuzu | 358/257 |
| 4,710,951 | 12/1987 | Itezono | 358/257 |
| 4,712,139 | 12/1987 | Kato | 358/257 |
| 4,727,435 | 2/1988 | Ohtani | 358/257 |
| 4,764,951 | 8/1988 | Kotani | 358/257 |
| 4,811,111 | 3/1989 | Kurokawa | 358/440 |
| 4,823,193 | 4/1989 | Takahashi | 358/434 |
| 4,870,503 | 9/1989 | Miura | 358/440 |

FOREIGN PATENT DOCUMENTS

| | | | |
|---|---|---|---|
| 0090715 | 8/1978 | Japan | 358/256 |
| 0112179 | 7/1982 | Japan | 358/440 |
| 0019076 | 2/1983 | Japan | 358/257 |
| 0103460 | 6/1984 | Japan | 358/256 |
| 0018743 | 1/1988 | Japan | 358/256 |
| 2089618 | 6/1982 | United Kingdom | 358/440 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

A facsimile equipment in accordance with the present invention comprises a key input unit for specifying a receiver or receivers to which a data is to be sent, a means for detecting a key input through the key input unit, a data memory for storing therein receiver data of the receiver or receivers corresponding to the key input, a character generator for storing a character font, and image signal memory for developing said character font, wherein the receiver data corresponding to the receiver or receivers specified by the key input unit are developed into receiver image signals.

11 Claims, 6 Drawing Sheets

| ADDRESS | DIAL NUMBER | RECEIVER INFORMATION | |
|---|---|---|---|
| 10 | ooo oooo | TO: N.Y. OFFICE | ----- |
| 11 | ooo oooo | TO: TOKYO OFFICE | ----- |
| ⋮ | ⋮ | ⋮ | |
| 15 | ooo oooo | TO: N.Y. OFFICE | ----- |
|  | ooo oooo | TO: WASHINGTON OFFICE | ----- |
|  | ooo oooo | TO: BOSTON OFFICE | ----- |

---

FACSIMILE COVER LETTER

TOSHIBA CORPORATION

DATE: oooo

TO: N.Y. OFFICE
PHONE: ooo oooo

TO: WASHINGTON OFFICE
PHONE: ooo oooo

TO: BOSTON OFFICE
PHONE: ooo oooo

FACSIMILE COVER LETTER

TOSHIBA CORPORATION

DATE : ○○○○

TO : N.Y. OFFICE
      PHONE: ○○○ ○○○○

FIG. 5(a)

FACSIMILE COVER LETTER

TOSHIBA CORPORATION

DATE : ○○○○

TO :   N.Y. OFFICE
        PHONE: ○○○ ○○○○

TO :   WASHINGTON OFFICE
        PHONE: ○○○ ○○○○

TO :   BOSTON OFFICE
        PHONE: ○○○ ○○○○

FIG. 5(b)

| DIAL NUMBER | ADDRESS |
|---|---|
| ooo oooo | 12 |
| ooo oooo | 14 |
| ⋮ | ⋮ |

FACSIMILE EQUIPMENT

BACKGROUND OF THE INVENTION:

1. Field of the Invention

The present invention relates to a facsimile equipment which has a function of automatically generating receiver image signals indicative of information of receivers to which a data of an original document is to be sent.

2. Description of the Related Art

In sending the data of an original document with use of a facsimile equipment, conventionally, there has been usually sent the address data of a paper sheet on which the address of a receiver is written, together with the original document data.

For this reason, it has been necessary for the operator to separately prepare a paper having the address of a receiver thereon prior to sending the original document data. In the case where the receiver is always the same, the once prepared address paper can be advantageously used not only once but a plurality of times. However, when it is desired to send the data of an original document to a plurality of locations or receivers as in a multi-address communication and such receivers vary in combination each time such data sending operation is made, i.e., when the data sending operation is based on a so-called discrete multi-address system, or when it is desired to send the data with only a part deleted or added to receivers that are previously registered as a group; it has been necessary that the operator separately prepare individual papers having the different addresses of the receivers written thereon.

In this way, when it is desired to send data to any combinations of receivers, the conventional facsimile equipment has required the individual papers separately for each combination o send them together with the original document data.

It is an object of the present invention, therefore, to provide a facsimile equipment which eliminates the above defect in the prior art and which allows automatic preparation, edition and transmission of receiver image signals indicative of the information of previously registered receivers, together with the image data signal of an original document.

It is another object of the present invention to provide a facsimile equipment capable of preparing a cover page corresponding to each receiver in multi-address communications.

SUMMARY OF THE INVENTION:

In accordance with the present invention, the above object is attained by providing a facsimile equipment which comprises a key input unit for specifying a receiver or receivers to which a data is to be sent, a means for detecting a key input through the key input unit, a data memory for storing therein receiver data of the receiver or receivers corresponding to the key input, a character generator for storing a character font, and image memory for developing said character font, wherein the receiver data corresponding to the receiver or receivers specified by the key input unit are developed into receiver image signals.

In accordance with the present invention, since receiver data corresponding to receivers to be sent are previously stored in a receiver data memory and ones of the receiver data corresponding to a key input are once developed on an image memory and then sent in the form of receiver image signals, it eliminates the need for prepare the individually addressed papers.

In the present invention, when there is a key input, ones of the address data of the receivers corresponding to the key input are sequentially taken out from the receiver address data memory in which the receiver address data are stored, and then are developed on the image signal memory as receiver image signals. Accordingly, the present invention has advantages which follow.

That is, when it is desired to send data to a plurality of receivers as in the multi-address communication, it is possible to separately develop and send the addresses of the receivers, or it is also possible to prepare a table listing all the receiver addresses and then commonly send it, which selection is determined by the application purpose. In addition, by operating a special key, image data corresponding to the receivers may be selectively prepared.

BRIEF DESCRIPTION THE DRAWINGS

FIGS. 5A-5C show examples of cover pages prepared in the present embodiment;

FIG. 6 is a flowchart showing in detail a part of the flowchart of FIG. 4;

DESCRIPTION OF THE PREFERRED EMBODIMENT

Figure 1:
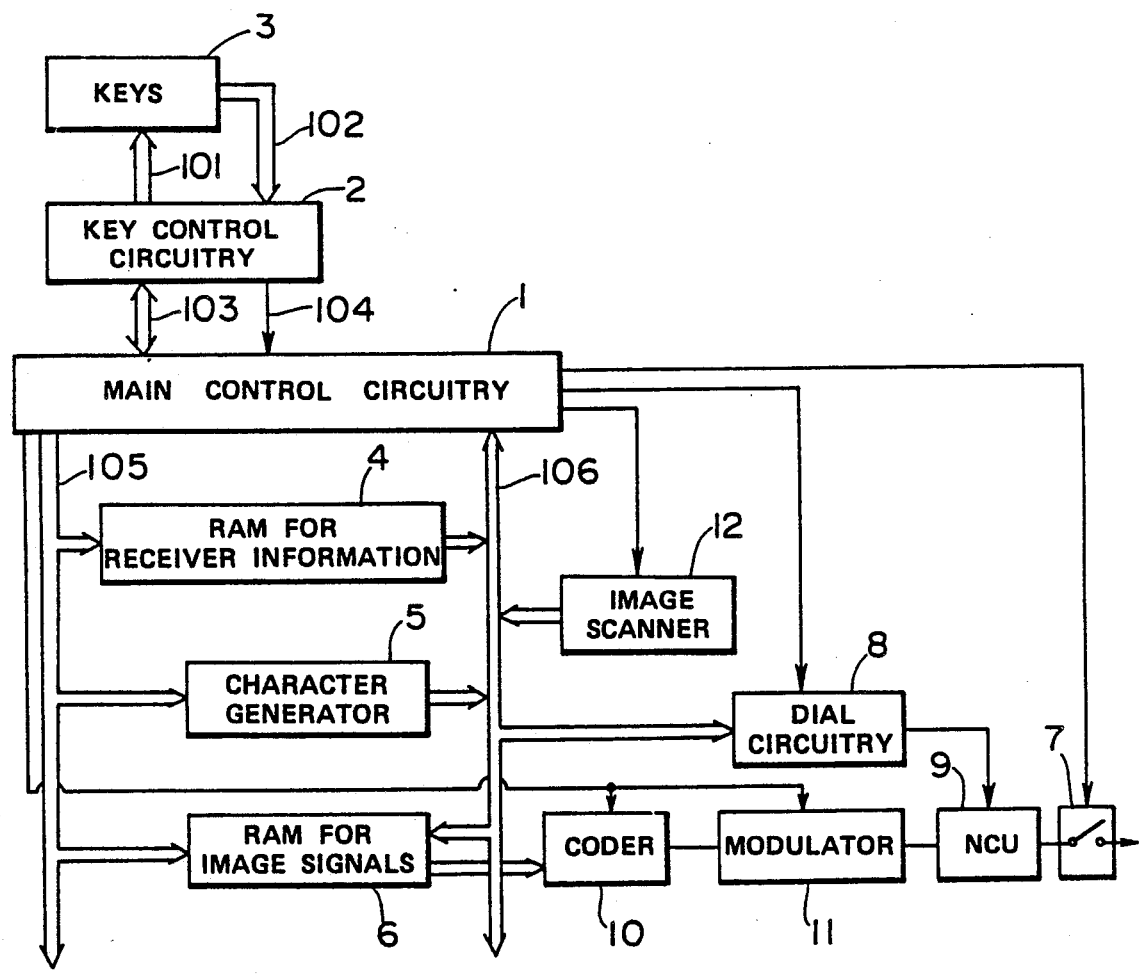
FIG. 1 is a block diagram showing an embodiment of a facsimile equipment of the present invention.

Referring to FIG. 1, there is shown a block diagram of an embodiment of a facsimile equipment in accordance with the present invention. In the drawing, keys 3, which are arranged in a matrix form, are provided in an operating part (not shown) of the facsimile equipment of the present embodiment to be connected between a key scanning signal line 101 onto which a key scanning signal is sent from a key control circuitry 2 and a return line 102 from which a key output or return signal of the keys 3 is inputted to the key control circuitry 2. More specifically, the key control circuitry 2 sends the key scanning signal to the key scanning signal line 101 at regular intervals to detect whether or not the key matrix is closed, i.e., whether or not any of the keys is depressed on the basis of transient state of the return signal on the line 102. When the key control circuitry 2 detects a variation in the signal of the return line 102, it generates an interrupt signal 104 to a main control circuitry 1. The circuitry 1, when receiving the interrupt signal 104, accepts a data indicative of the depressed one of the keys from the key control circuitry 2 through an interface bus 103.

The main control circuitry 1, on the basis of the information indicative of the depressed key received from the key control circuitry 1, controls a RAM 4 for receiver information, a character generator 5 for storing a character font therein and a RAM 6 for image signals through an address bus 105 and a data bus 106; and also controls a line relay 7, a dial circuitry 8, a network control unit (NCU) 9, a coder 10, a modulator 11 and image scanner 12 through the respective signal lines. More in detail, the main control circuitry 1 controls the character generator 5 on the basis of the contents memorized in the receiver information RAM 4 to develop on the image signal RAM 6 an image data indicative of an address to be sent; controls the line relay 7, the dial circuitry 8 and the network control unit 9 to establish a communication circuit between the facsimile equipment and the sending destination office of the address entered through the keys 3; sends the image data developed on the image signal RAM 6 onto a telephone line through the coder 10, the modulator 11, the network control unit 9 and the line relay 7; stores the image data read by an image scanner 12 into the image signal RAM 6 through the data bus 106; and subsequently controls the sending operation of the stored image data onto the telephone line through the coder 10, the modulator 11, the network control unit 9 and the line relay 7.

Figures 2, 3:
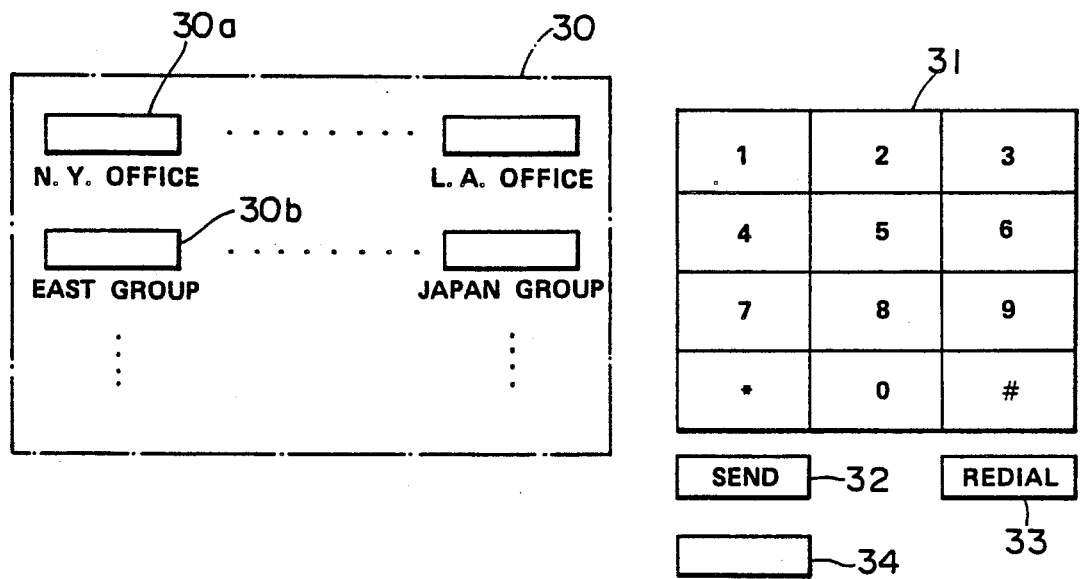
FIG. 2 shows an array of keys used in the embodiment shown in FIG. 1.
FIG. 3 shows contents stored in a receiver data memory.

FIG. 2 shows an example of key array of the keys 3. The keys 3 include a plurality of function keys 30 to which a plurality of dial numbers are allocated, ten keys 31 together with keys "*" and "#", a sending key 32, a redial key 33, and a special key 34 which is operated when it is desired to inhibit the preparation of a heading or cover page to be explained later.

Shown in FIG. 3 is an example of contents stored in the receiver information RAM 4 in the form of a table showing a relation between addresses, dial numbers of the corresponding sending destination offices and receiver information. In this connection, one address is not necessarily related to one dial number and one receiver information, and one address may be related as necessary to a plurality of dial number and a plurality of receiver information. For example, a key 30a of the function keys 30 corresponding to "N.Y. OFFICE" in FIG. 2 corresponds to address "10" in FIG. 3, which address is related to one dial number and one receiver information "TO: N.Y. OFFICE . . . "; whereas a key 30b of the function keys 30 corresponding to "EAST GROUP" in FIG. 2 corresponds to address "15" in FIG. 3, which address is related to three dial numbers and three associated receiver information "TO: N.Y. OFFICE . . . ", "TO: WASHINGTON OFFICE . . . " and "TO: BOSTON OFFICE . . . ".

The operation of the equipment shown in FIG. 1 will next be explained by referring to a flowchart of FIG. 4.

When the main control circuitry 1 receives a key data from the key control circuitry 2 (step 201), it judges whether or not the received key data is a data corresponding to an address function key, that is, corresponding to one of the function keys 30 shown in FIG. 2 (step 202). If the main control circuitry 1 judges that the received data is of an address function key, then it determines an address (refer to FIG. 3) corresponding to this key data (step 203) and reads out from the receiver information RAM 4 a dial number or numbers and a receiver information or informations corresponding to this address (step 204).

Then the main control circuitry 1 judges whether or not the special key 34 (refer to FIG. 2) for inhibiting the preparation of the cover page was operated (step 205). If the special key 34 was not operated, then the main control circuitry 1 supplies to the character generator 5 the corresponding receiver data read out from the receiver information RAM 4, registers in the image signal RAM 6 the obtained image signal as a cover page image signal, and prepares a cover page on the basis of the receiver data read out from the RAM 4 (step 206).

Figures 5C, 6:
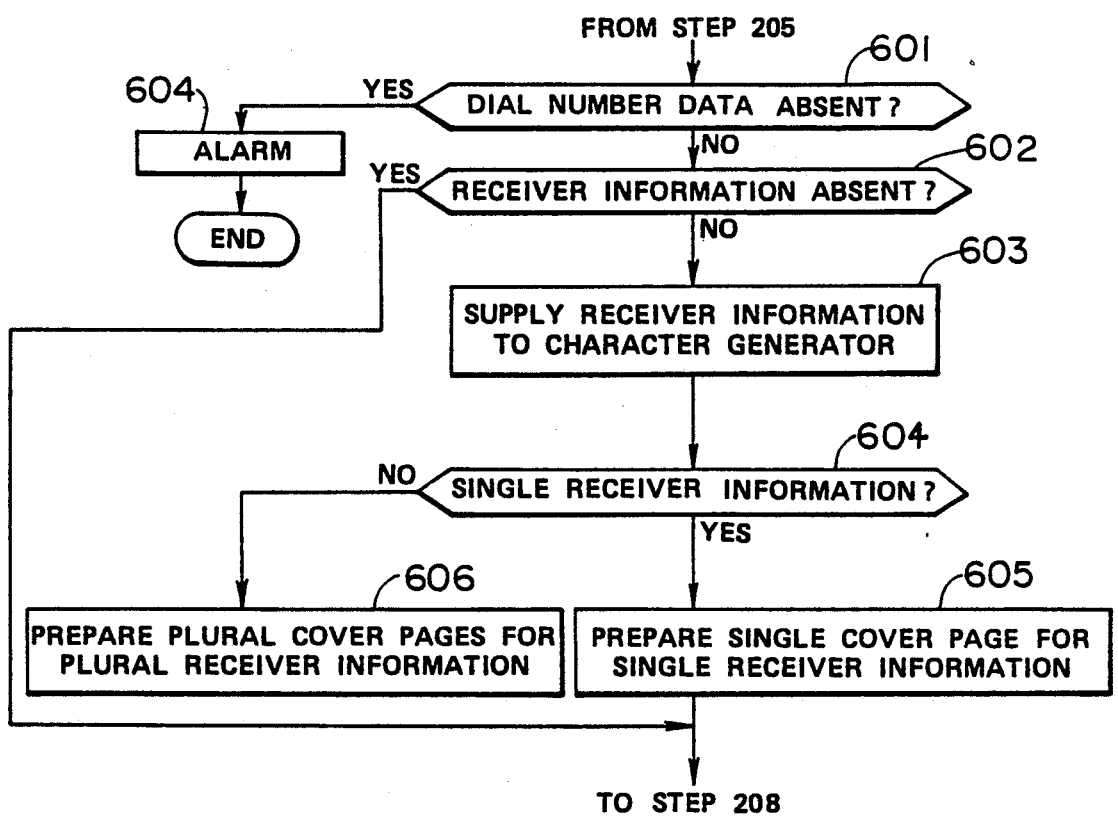

Examples of the cover page are shown in FIGS. 5A–5C. More specifically, there is shown an example of the cover page when address "10" in the table of FIG. 3 is selected, in FIG. 5(a) wherein image data "TO: N.Y. OFFICE" and "PHONE: 000 0000" are prepared on the basis of the receiver data read out from the receiver data RAM 4. While, an image data "DATE: 0000" is prepared on the basis of a date data counted by the main control circuitry 1. Shown in FIG. 5(b) and (c) are examples of the cover page when address "15" in the table of FIG. 3 is selected, wherein FIG. 5(b) corresponds to a cover page in sending the original document to N.Y. OFFICE and FIG. 5(c) corresponds to a cover page in sending of the original document to WASHINGTON OFFICE. As will be clearly seen from FIG. 5(b) and (c), in the case of a plurality of receivers, the cover page is edited so that the address of one of the receivers to be sent is written at the head of a group of the receiver addresses. When the main control circuitry 1 judges at the step 205 that the special key is not operated, the cover page preparation processing at the step 206 is not executed.

When the main control circuitry 1 determines at the step 202 that the received key data is not of the address function key, it judges that the received data is of the dial number entered by the ten keys 31 and receives and stores it as a dial number data (step 207).

After the main control circuitry finishes the processing at the step 206 or 207 or determines at the step 205 that the special key has not been operated, it judges whether or not the sending key 32 (refer to FIG. 2) has been operated (step 208). If the sending key 32 is not operated after the passage of a predetermined time (for example, 60 seconds), then this flow processing ends (step 209).

If the sending key 32 is operated within the predetermined time, then the main control circuitry controls to close the line relay 7 (see FIG. 1) (step 210) and to supply to the dial circuitry 8 the dial number data read out at the step 204 or the dial number data stored at the step 207 for dial transmission (step 212).

Subsequently, it is judged whether or not a predetermined communication procedure with the party receiver office has been determined (step 213). If the main control circuitry judges that the predetermined communication procedure has been determined, then it controls to start driving the image scanner 12 and start reading image signals to be sent, and then to store the read image signals sequentially in the image signal RAM 6 (step 214). The image signals in the RAM 6 are sequentially supplied to the coder 10 (step 215) to start sending the image signals. In sending the image signals, if the cover page is to be prepared at the step 206, then one of the image signals corresponding to the cover page is first sent and then ones of the image signals corresponding to the image data read out by the image scanner 12 are sent. This operation is repeated until the main control circuitry judges the completion of sending the image signals (step 216).

When the main control circuitry judges at the step 216 the completion of sending the image signals, it decides at a step 217 whether or not there is another receiver to be sent. If there is another receiver, then the main control circuitry controls to open the line relay 7 (step 219) and the control is returned back to the step 210 to execute the processing of sending image signals for the next receiver. This operation is repeated until there does not exist any other receiver to be sent. In the absence of any other receiver to be sent, the main control circuitry controls to open the line relay 7 (step 218), terminating this flow processing. If the main control circuitry decides at the step 213 that the communication procedure is not determined, then it controls to generate an alarm (step 220) and subsequently to open the line relay 7, whereby this flow processing is terminated.

Figure 4:
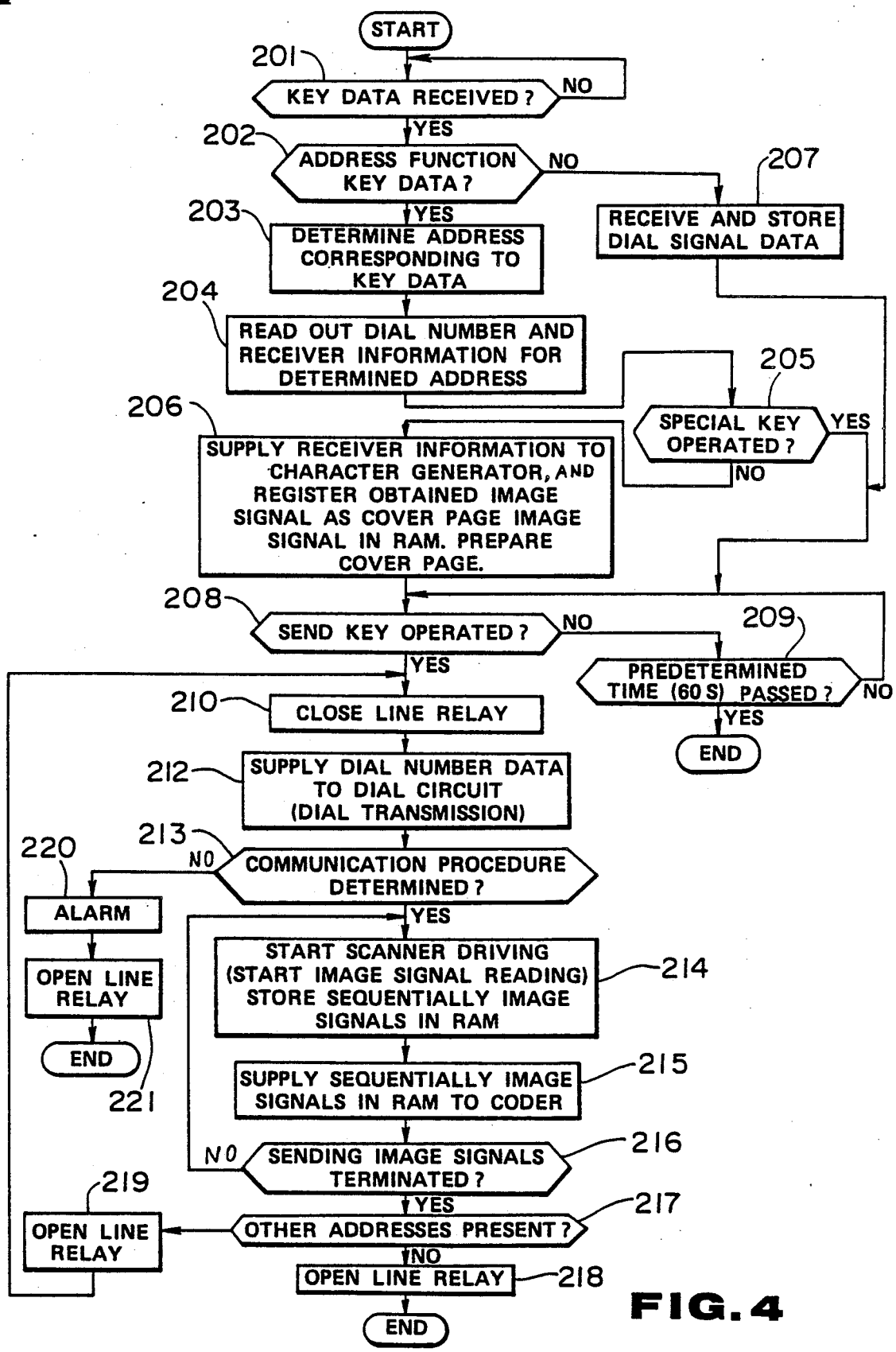
FIG. 4 is a flowchart for explanation of the operation of the embodiment.

FIG. 6 shows details of the step 206 in FIG. 4. With the arrangement shown in FIG. 6, it is first decided at a step 601 whether or not there exists the corresponding dial number data in the receiver data RAM 4. If the absence of the dial number data is determined, then it is decided at a step 602 whether or not there exists any receiver data in the RAM 4. The determination of the presence of the receiver data causes the receiver data read out from the receiver data RAM 4 to be supplied to the character generator 5 (step 603). At a step 604, it is judged whether the receiver data comprises one or plural data. In the case of the single receiver data, a single cover page corresponding to this single receiver data is prepared (step 605). In the case of he plural receiver data, a plurality of cover pages corresponding to the plural receiver data are prepared at a step 606. In the illustrated embodiment, the single cover page is prepared to contain a single receiver data as shown in FIG. 5(*a*), whereas the plural cover pages are prepared to contain the plural receiver data but respectively corresponding one of the plural receiver data at the head thereof. The each cover page is sent to the respective receiver at the aforementioned sending step. When it is determined at the step 601 that there is no dial number data, an alarm is generated at a step 604 and this flow processing is terminated. If it is judged at the step 602 that there is no receiver data, then the cover preparation processing at the step 603 is not carried out and the control is transferred to the step 208 without any processing.

Figures 7, 8:
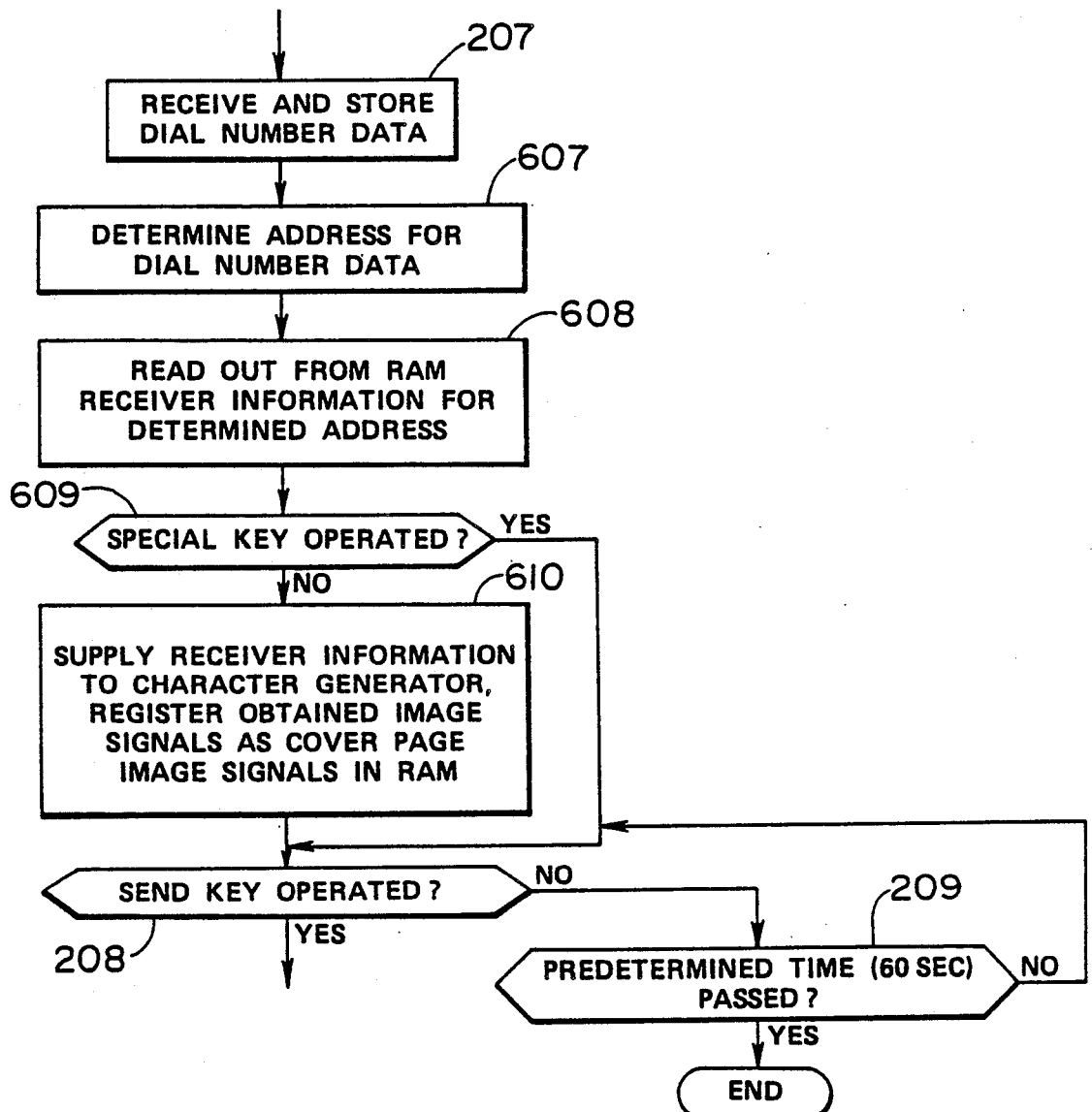
FIG. 7 is a flowchart showing a modified example of a part of the flowchart of FIG. 4.
FIG. 8 shows an example of table necessary for realizing the flowchart shown in FIG. 7.

A modified example of the flowchart of FIG. 6 is shown in FIG. 7 and is arranged so as to prepare the cover page or pages on the basis of the dial number data entered through key input. More in detail, when a dial number data is received and stored at the step 207 (refer to FIG. 4), an address corresponding to this dial number is determined at a step 607. To this end, such a table memorizing a relation between the dial numbers and the corresponding addresses must be previously prepared as shown in FIG. 8. When the address corresponding to the dial number is determined, the table of the receiver data RAM 4 shown in FIG. 3 is retrieved to read out the receiver data corresponding to the determined address from the RAM (step 608).

Subsequently, it is decided at a step 609 whether or not the special key 34 for inhibiting the preparation of the cover page has been operated. If the decision is that the special key 34 has not been operated, then the receiver data read out from the receiver data RAM 4 is supplied to the character generator 5 and the obtained image signal is registered in the image data RAM 6 as a cover page image signal to prepare the cover page on the basis of the cover page image signal (step 610).

After the processing at the step 205 or 207 has been completed or the decision at the step 205 is that the special key has not been operated, it is judged at the step 208 whether or not the sending key 32 (refer to FIG. 2) has been operated. When the sending key 32 is not operated after passage of a predetermined time (for example, 60 seconds), this flow processing is terminated.

What is claimed is:

1. A facsimile equipment, comprising:
   destination office information storing means for storing at a respective address therein destination office information representing a plurality of destination offices to which a manuscript is to be sent;
   destination office information reading means, coupled to said destination office information storing means, for reading said destination office information stored in the respective address of the destination office storing means;
   character generator means having a plurality of fonts, coupled to the destination office information reading means, for generating a destination office information image signal corresponding to said destination office information read from the destination office information reading means;
   manuscript scanning means including means for scanning a manuscript to be sent to the plurality of destination offices and means for generating a corresponding manuscript image signal, each destination office having a receiver for receiving the manuscript sent from the manuscript scanning means;
   image signal storing means, coupled to said manuscript scanning means, for storing the corresponding manuscript image signal generated from the manuscript scanning means;
   image signal reading means, coupled to the image signal storing means, for reading the manuscript image signal stored in the image signal storing means; and
   sending means, coupled to the character generator and image signal storing means, for sending to a respective receiver the destination office information image signal generated from the character generator means which represents the plurality of destination offices and the manuscript image signal read from the image signal reading means in sequence so that said respective receiver receives in sequence said destination office information image signal and manuscript image signal sent from the sending means.

2. The facsimile equipment of claim 1, wherein the sending means includes means for providing image data representing a cover page corresponding to said destination office information and sending said cover page image data to a respective receiver prior to sending said manuscript image signal.

3. The facsimile equipment of claim 1, wherein
   said stored destination office information includes at least one dial number, said dial number corresponding to a receiver;
   the destination office information reading means reads said stored dial number at an address corresponding to said receiver to which a manuscript is to be sent; and
   the sending means sends to said receiver said destination office information image signal and said manuscript image signal in sequence in response to said read dial number.

4. The facsimile equipment of claim 3, wherein
   said stored destination office information includes a plurality of dial numbers and a plurality of corresponding receiver information items wherein each of the dial numbers corresponds to a receiver information item which corresponds to a designated receiver;

the destination office information reading means reads said stored plurality of dial numbers and said plurality of corresponding receiver information items at addresses corresponding to said plurality of receivers to which a manuscript is to be sent;

said destination office information image signal corresponds to the plurality of corresponding receiver information items; and the sending means sequentially sends out said destination office information image signal and said manuscript image signal to each corresponding receiver in response to said read plurality of dial numbers.

5. The facsimile equipment of claim 4, wherein the sending means rearranges said manuscript and destination office information image signal whereby one of the plurality of receiver information items is disposed on top of another of the plurality of receiver information items at times when a manuscript is sent to a receiver corresponding to said one of the plurality of receiver information items.

6. A facsimile equipment comprising:

key input means operative for designating at least one receiver;

destination office information storing means for storing at a respective address therein destination office information representing a plurality of destination offices to which a manuscript is to be sent;

destination office information reading means, coupled to said destination office information storing and key input means, for reading said destination office information stored in the respective address of the destination office information storing means in response to the operation of said key input means;

character generator means, coupled to said destination office information reading means, having a plurality of fonts for generating a destination office information image signal corresponding to said destination office information read from the destination office information reading means;

manuscript scanning means including means for scanning a manuscript to be sent to the plurality of destination offices, each destination office having a designated receiver and means for generating a corresponding manuscript image signal;

image signal storing means, coupled to said manuscript scanning means, for storing the manuscript image signal generated from the manuscript generating means;

image signal reading means, coupled to the image signal storing means, for reading the manuscript image signal stored in the image signal storing means; and sending means, coupled to the character generator and image signal storing means, for sending out said destination office information image signal generated from the character generator means which represents the plurality of destination offices and the manuscript image signal read from the image signal reading means in sequence to the designated receiver in response to the operation of the key input means so that said designated receiver receives in sequence the destination office information image signal and manuscript image signal sent from the sending means.

7. The facsimile equipment of claim 6, wherein the destination office information storing means has a first storing means for storing addresses corresponding to said designated receivers and a second storing means for storing said corresponding destination office information.

8. The facsimile equipment of claim 6, wherein the key input means includes a plurality of one-touch keys, each corresponding to at least one receiver and being operative for designating an address in the destination office information storing means;

said stored destination office information includes at least one dial number and a corresponding receiver information item corresponding to said one-touch key;

wherein the destination office information reading means reads said stored at least one dial number and corresponding receiver information item at the designated address in response to the operation of said one-touch key.

9. The facsimile equipment of claim 8, wherein said stored destination office information includes a plurality of dial numbers and a plurality of corresponding receiver information items wherein each of the dial numbers corresponds to a receiver information item which corresponds to a designated receiver;

the destination information reading means reads said stored plurality of dial numbers and said plurality of receiver information items at the designated address in response to the operation of each one-touch key;

said destination office information image signal corresponds to the plurality of corresponding receiver information items; and the sending means sequentially sends out said destination office information image signal and said manuscript image signal to each corresponding receiver in response to said read plurality of dial numbers.

10. A facsimile equipment comprising:

first key input means operative for designating a plurality of receivers;

destination office information storing means for storing at an address destination office information representing the plurality of destination offices, each destination office corresponding to one of the designated plurality of receivers to which a manuscript is to be sent;

destination office information reading means, coupled to the destination office storing and first key input means, for reading said destination office information stored in the respective address of the destination office information storing means in response to the operation of the first key input means;

destination office information image forming means, coupled to the destination office information reading means, for forming a destination office information image signal corresponding to said destination office information read from the destination office information reading means;

manuscript scanning means including means for scanning a manuscript to be sent to the designated receivers and means for forming a corresponding manuscript image signal;

image signal storing means, coupled to the manuscript scanning means, for storing said manuscript image signal;

image signal reading means, coupled to the image signal storing means, for reading the manuscript image signal stored in the image signal storing means; and sending means, coupled to the destination office information image forming and image signal reading means, for sending said destination office information image signal formed from the destination office information image forming means which represents the plurality of destination offices and the manuscript picture image signal read from the image signal reading means in sequence to said designated receiver in response to the operation of the first key input means;

second key input means operative for specifying not forming said designation office information image signal; and means, coupled to the destination office information image signal forming and second key input means, for inhibiting execution by said destination office information image signal forming means in response to the operation of the second key input means.

11. The facsimile equipment of claim 10, wherein the destination office information stored in the destination office information storing means includes a plurality of dial numbers and a plurality of corresponding receiver information items wherein each of the dial numbers corresponds to a receiver information item which corresponds to a designated receiver;

the destination office information reading means reads the plurality of dial numbers and the plurality of corresponding receiver information items at addresses corresponding to said designated receivers to which a manuscript is to be sent;

the sending means sequentially sends out the destination office information image signal and said manuscript image signal to each corresponding receiver in response to said read plurality of dial numbers.

* * * * *